United States Patent Office

3,291,673
Patented Dec. 13, 1966

3,291,673
PROCESS OF BONDING ARTICLES WITH ALKYLENE DICYANAMIDE AT TEMPERATURES BELOW 100° C.
Kiichiro Sugino, Shinjuku-ku, Tokyo, Kozo Shirai, Shinagawa-ku, Tokyo, and Rokuro Kitawaki, Mitaka-shi, Tokyo, Japan, assignors to Nippon Carbide Industries Co., Inc., Tokyo, Japan, a corporation of Japan
No Drawing. Filed May 14, 1962, Ser. No. 201,228
8 Claims. (Cl. 156—331)

This invention relates to new polymers, and more particularly to polymers of alkylenedicyanamide and to a process for their preparation and their application. This application is a continuation-in-part of our earlier copending application 77,288, filed December 21, 1960, and now abandoned.

In this specification the term "polymer" means not only homopolymers of an alkylenedicyanamide but also copolymers of two or more alkylenedicyanamides.

Alkylenedicyanamide is a practically unknown substance. The only instance where a substance similar to this has been reported is the hexamethylenedicyanamide which is listed by H. Dreyfus in British Patent No. 549,368 in 1942 and in U.S. Patent No. 2,349,851 in 1944.

According to these two patents, the only thing mentioned is that hexamethylenedicyanamide is a light yellowish sticky liquid which has a boiling point of 150–155° C. under a pressure of 50 mm. Hg. But according to the research carried out by us, the above mentioned compound is not the true hexamethylenedicyanamide (M.P. 64–65° C.) but a very different substance.

We have prepared this new compound in its pure state for the first time as shown in our U.S. Pat. 3,130,224 (which issued April 21, 1964 on an application filed Oct. 26, 1961) and, after confirming that there was no doubt as to its construction, we have carried out detailed study on it.

Alkylenedicyanamide is a compound that can be expressed by the following chemical formula:

NC.NH.(CH$_2$)$_n$.NH.CN ($n$ is an integral number from 1 to 20).

Examples of these compounds are 1,4-tetramethylenedicyanamide, 1,5-pentamethylenedicyanamide, 1,6-hexamethylene-dicyanamide, 1,7-heptamethylenedicyanamide, 1,8 - octamethylenedicyanamide, 1,9 - nonamethylenedicyanamide and 1,10-decamethylenedicyanamide, etc. These compounds can be prepared by reacting cyanogen halide (or halogencyan) with alkylendiamine. Generally, they have melting points lower than 100° C. and are soluble in alcohol and ketone but hardly soluble in water, ether or benzene, etc.

As a result of long and careful study of these series of compounds, we have discovered that by polymerizing them with each other, hard, colorless and transparent polymers are obtained. Although there are many kinds of polymers which have been known, there has been no instance where polymers like these have been produced by the mutual polymerization of alkylenedicyanamide. Alkylenedicyanamides can be readily polymerized just by keeping them, with or without accelerators, in liquid state at an appropriate temperature in which there is no change in weight. Although this polymerization is a heat producing reaction, no problem is created when only a small amount is polymerized or when the polymerization results in the formation of a film. However, in case a large amount is handled, great care should be taken. For example, when polymerization of alkylenedicyanamide is carried out near or above its melting point, the temperature rises suddenly because of the heat produced by the reaction after several minutes. As a result, foam is created and a coloring phenomenon occurs.

As one method to prevent this heat evolution, the first stage of the polymerization (primary polymerization) can be carried out by melting the alkylenedicyanamide near its melting point and then quickly cooling it to an appropriate temperature (a temperature in which the alkylenedicyanamide does not crystallize) and keeping it at that temperature.

Another method to prevent heat evolution is to carry out the primary polymerization through the evaporation of the solvent from a concentrated solution of alkylenedicyanamide in alcohols or ketones at an appropriate temperature.

In a nutshell, it is considered appropriate to adopt methods by which the primary polymerization product of alkylenedicyanamide is produced initially and then complete the polymerization process. This primary polymerization product is considered to be a compound which is non-crystalline and soluble in alcohol and made up of mixture of high molecular linear polymer having a dicyandiamide-type linkage and part of the raw material on which reaction had not taken place. In cases in which the primary polymerization product has methyl radicals with more than 6 carbon atoms, if the polymerization reaction is continued further, it becomes possible to spin this polymer into yarn at an appropriate viscosity.

The polymer obtained through this method is a hard and bright resin which is colorless and transparent and is characterized by its strong adhesive power as well as high resistance against cold water, hot water, acids, alkalis, organic solvents and light. It is not inflammable and has excellent properties as an insulator.

We have further found that by suitably polymerizing alkylenedicyanamides with each other, it is possible to obtain films which are very hard, lustrous, colorless and transparent. These films are characterized by their strong adhesive power as well as their strong resistance against cold water, acids, alkalis, organic solvents and light. They also have high resistance against hot water and are non-flammable, infusible and have good insulating properties.

In regard to the forming of film by polymerizing alkylenedicyanamide, the alkylenedicyanamide is used alone or mixed with other alkylenedicyanamides in any proportion desired in crystal or liquid form. The primary polymerization product obtained by the methods described above can also be used instead of alkylenediamines themselves. This is then spread or coated homogeneously with or without polymerization accelerators on the surface of basic material such as glass, metal, ceramic or wood. After this is done, the polymerization can be completed by heating at an appropriate temperature. In case alkylenedicyanamide or its mixture is used in crystal form, after they have been melted to transparency, they are heated near the melting point or eutectic point at an appropriate temperature. With the completion of the polymerization, a very hard, glossy and transparent film will be formed on the surface of the basic material.

When an alkylenedicyanamide alone or alkylenedicyanamides mixed together in any proportion desired are dissolved in such organic solvents as aliphatic alcohols and aliphatic ketones and the solution is coated on the surface of basic material such as glass, metal, ceramic and wood, etc., alone or together with additive agents such as pigments or metallic powder, and then heated so as to evaporate the solvents, thereby the same type of strong, glossy film is formed on the surface of the basic material after carrying out the same treatment mentioned above.

Furthermore, when alkylenedicyanamide or its primary polymerization product in crystal or liquid form or in solution is spread or coated homogeneously on the surface of the basic material and the material laminated and pressed together and heated, the polymerization can be completed in a short period of time and the material bonded strongly together. The shear strength in the case of binding glass with glass is 400 kg./cm.$^2$ and the failure of glass is 100 percent. Even when immersed in hot water, the shear strength does not diminish.

The above mentioned film forming reaction does not necessarily have to be done by heating. As long as the alkylenedicyanamides are in liquid form (in case of crystals, they should be in melted form), the reaction takes place even at room temperature gradually with the same type of film forming.

Agents to accelerate polymerization are amines such as primary, secondary and tertiary amines, alkylenediamines, polyamines, aromatic amines, ammonia, etc., and their salts. The ratio of use of these agents is 0.01–0.0001 against one part of alkylenedicyanamide. By the use of these agents, the duration of the reaction can be greatly shortened.

If it is desirable to repress the polymerization reaction, this can be completely accomplished by adding a small amount of acid such as an organic and inorganic acid, particularly alkylenedicarboxylic acid, to the alkylenedicyanamide or its solution. From these results, the polymerization reaction of alkylenedicyanamide is practically halted at less than pH 7 and it was found that when the acidity was more than pH 7, and particularly at pH 8, the reaction started violently.

Consequently, the alkylenedicyanamide can be used as a binder for glass, metals, ceramics and wooden goods as well as general synthetic resins. It also has fiber-forming properties and can be mixed with pigments or metallic powder and used as paint. Since it can be polymerized at low temperature and the film formed is very strong and hard, it can be used to bind or cover general electric material, particularly material for the radio, television and electronics industries.

A few examples are given as below.

*Example 1*

By placing 20 g. of hexamethylenedicyanamide (M.P. 64–65° C.) in a suitable vessel, for example, iron, stainless steel, aluminium and other metallic vessels and heating it, it will turn into a colorless and transparent liquid near the melting point. By continuously stirring this liquid for several minutes at the melting temperature and then reducing the temperature gradually to an extent in which crystals do not form even at a temperature less than 40° C., the liquid is then cooled suddenly to room temperature thereby achieving primary polymerization. A colorless, transparent and sticky primary polymerization product which is soluble in alcohol amounting to about 20 g. is obtained. In this case, it is particularly necessary to take care that any sudden rise in the temperature due to heat evolution will not occur.

When this primary polymerization product is left for a long time under room temperature, it will solidify into a colorless, transparent, glossy and hard polymer without any change in weight. It will also solidify when heated at a temperature of 40–80° C. in about one to two hours, taking the form of the same polymer that had been attained by leaving it under room temperature for a long time.

This polymer can be molded together with fillers such as α-cellulose, glass fiber, metallic powder, carbon powder and pigments.

When the original primary polymerization product is subjected to further polymerization process under relatively low temperature such as from 10 to 60° C. and when it is extruded from a spinneret at a viscosity which makes it possible to turn it into yarn and stretched out in the air at a temperature of from 20 to 100° C., then a colorless glossy fiber is obtained.

This polymer is insoluble in hot water, hot alcohol and other solvents. It does not have a melting point and at 300° C., it gradually begins to take on color and then to carbonise.

*Example 2*

By placing 20 g. of tetramethylenedicyanamide or pentamethylenedicyanamide in a suitable vessel and subjecting it to a primary polymerization process while continuously stirring at around 40° C. and preventing heat evolution, some 20 g. of a colorless, transparent and sticky primary polymerization product was obtained. If this product is treated in the same way as explained in Example 1, a hard, colorless, transparent and glossy polymer will result and molding is also possible. The properties of this polymer are approximately the same as those of the polymer obtained in Example 1. It does not have any melting point and is insoluble in hot water, hot alcohol and other solvents.

*Example 3*

By placing 20 g. of heptamethylenedicyanamide (M.P. 60–61° C.) in a suitable vessel and subjecting it to a primary polymerization process in a similar way as that mentioned in Example 1, about 20 g. of a sticky, colorless and transparent primary polymerization product is obained. When this product is treated in the same manner as that indicated in Example 1, the resulting product is a hard, colorless, transparent and glossy polymer which is moldable and can be made into fiber.

The properties of this polymer are about the same as those of the polymer mentioned in Example 1. It is insoluble in hot water, hot alcohol and other solvents and does not have any melting point.

*Example 4*

By placing 20 g. of octamethylenedicyanamide (M.P. 71–73°) in a suitable vessel and carrying out primary polymerization reaction in a similar way as that mentioned in Example 1, about 20 g. of a sticky, colorless and transparent primary polymerization product is obtained.

When this product is treated in the same manner as that indicated in Example 1, the resulting product is a hard, colorless, transparent and glossy polymer which is moldable and can be made into fiber.

The properties of this polymer are approximately the same as those of the polymer obtained in Example 1 except that it is a little softer.

*Example 5*

By placing 20 g. of nonamethylenedicayanamide (M.P. 42° C.) in a suitable vessel and after melting it near the melting point, and carrying out primary polymerization reaction at 40 to 80° C. while stirring continuously in order to prevent any sudden heat evolution for one to several hours, some 20 g. of a sticky, colorless and transparent primary polymerization product is obtained.

When this product is treated in the same manner as that mentioned in Example 1, the resulting product is a hard, colorless, transparent and glossy polymer which is moldable and can be made into fiber.

The properties of this polymer are exactly the same as those of the polymer of Example 4.

*Example 6*

By placing 20 g. of decamethylenedicyanamide (M.P. 74–76°) in a suitable vessel and subjecting it to a primary polymerization process in a similar way as that mentioned in Example 1, about 20 g. of a sticky, colorless and transparent primary polymerization product is obtained.

When this product is treated in the same manner as that indicated in Example 1, the resulting product is a hard, colorless, transparent and glossy polymer which is moldable and can be made into fiber.

The properties of this polymer are exactly the same as those of the polymer of Example 4.

*Example 7*

By placing a mixture of 10 g. of hexamethylenedicyanamide and 10 g. of nonmethylenedicyanamide in a suitable vessel and after melting it over the eutectic point and then subjecting it to a primary polymerization reaction for one to several hours while stirring continuously at a temperature from 40 to 60° C. in order to prevent sudden heat evolution, about 20 g. of sticky, colorless and transparent primary polymerization product (soluble in alcohol) is formed when the temperature is reduced to normal.

When this product is treated in the same manner as that indicated in Example 1, the resulting product is a hard, colorless, transparent and glossy copolymer which is mouldable and can be made into fiber.

The properties of this copolymer are about the same as those of the polymer of Example 1 except that it is a little softer.

*Example 8*

When a mixture of two or more of tetramethylenedicyanamide, pentamethylenedicyanamide, hexamethylenedicyanamide, heptamethylenedicyanamide, octamethylenedicyanamide, nonamethylenedicyanamide and decamethylenedicyanamide is put through a primary polymerization process at or in excess of the eutectic point, for instance, from 40 to 80° C., and care taken to prevent any sudden heat evolution as in the case of Example 1 and Example 7, there is no change in weight and a colorless, transparent and sticky primary polymerization product is obtained.

When this product is treated in the same manner as that indicated in Example 1, the resulting product is a hard, colorless, transparent and glossy copolymer which is moldable and can be made into fiber.

The properties of this copolymer are the same as those of the polymer of Example 7.

*Example 9*

When 20 g. of hexamethylenedicyanamide is dissolved in 80 g. of methanol (or ethanol, propanol and other aliphatic mono-alcohol or acetone and methylethylketone etc.) and used by itself or by adding fillers (for example, α-cellulose, glass fiber, metallic powder, carbon or pigments) in appropriate amount and then put through a primary polymerization process at ordinary or higher temperature, for example from 10 to 70° C. as in Example 1 and the solvents evaporated simultaneously, about 20 g. of a sticky primary polymerization product is obtained.

When this product is treated in the same manner as that indicated in Example 1, the resulting product is a hard, colorless, transparent and glossy polymer which can be moulded and turned into fiber.

The properties of this polymer are the same as those of the polymer of Example 1.

In the same way, hard, colorless, transparent and glossy polymers can be obtained from tetramethylenedicyanamide, pentamethylenedicyanamide, heptamethylenedicyanamide, octamethylenedicyanamide, nonamethylenedicyanamide or decamethylenedicyanamide by dissolving them in alcohols or ketones and by the same polymerization process. These polymers, of course, can be moulded and made into fibers.

*Example 10*

When 10 g. of hexamethylenedicyanamide and 10 g. of nonamethylenedicyanamide is dissolved in 80 g. of methanol or other solvents (the same as in Example 9) and used by itself or by adding fillers (the same as in Example 9) in appropriate amount and then put through a primary polymerization process as in Example 7 and the solvents evaporated simultaneously at ordinary or higher temperature (for example from 10 to 70° C.), some 20 g. of sticky primary polymerization product is obtained.

When this product is treated in the same manner as that described in Example 1, the resulting product is a hard, colorless, transparent and glossy polymer which can be moulded and turned into fiber.

The properties of this polymer are the same as those of the polymer of Example 7.

In the same way, hard, colorless, transparent and glossy copolymers can be obtained from tetramethylenedicyanamide, pentamethylenedicyanamide, hexamethylenedicyanamide, heptamethylenedicyanamide, octamethylenedicyanamide, nonamethylenedicyanamide and decamethylenedicyanamide by mixing more than two of them together in certain proportions and then dissolving them in alcohols or ketones (the same as in Example 9) and by the same polymerization process. Of course, these copolymers are moldable and can be made into fibers.

*Example 11*

By subjecting 20 g. of nonamethylenedicyanamide to primary polymerization in the same manner as described in Example 5, it results in the formation of about 20 g. primary polymerization product. When polymerization accelerators such as aliphatic primary, secondary, tertiary amine, alkylenediamine, polyamine, aromatic amine, ammonia and their salts amounting to 0.2–0.0002 g. are added to the product and left under room temperature for a long period, for instance from 10 to 20 hours, or when the whole is heated up to 40 to 80° C., it will solidify in several to 30 minutes and the reaction completed in a very short time resulting in the formation of a hard, colorless, transparent and glossy polymer which is moldable and can be made into fiber.

The properties of this polymer are exactly the same as those of the polymer of Example 5.

In the same way, respective polymers of tetramethylenedicyanamide, pentamethylenedicyanamide, hexamethylenedicyanamide, heptamethylenedicyanamide, octamethylenedicyanamide and decamethylenedicyanamide can be derived by the same operation and in a considerably short time.

*Example 12*

By placing 10 g. of heptamethylenedicyanamide and 10 g. of decamethylenedicyanamide mixture in a suitable vessel and after melting it near the eutectic point and subjecting it to primary polymerization in the same manner as Example 1, it results in the forming of about 20 g. of primary polymerization product. When polymerization accelerators such as those described in Example 11 are added in the amount of from 0.2 to 0.0002 gram and then left for a long period of time, for instance from 10 to 20 hours or when the whole is heated up to 40 to 80° C., it will solidify in several to 30 minutes and the reaction completed in a very short time resulting in the formation of a hard, colorless, transparent and lustrous polymer which is moldable and can be made into fiber.

The properties of this copolymer are the same as those of the copolymer of Example 7.

In the same way, hard, colorless, transparent and glossy copolymers can be obtained from tetramethylenedicyanamide, pentamethylenedicyanamide, hexamethylenedicyanamide, heptamethylenedicyanamide, octamethylenedicyanamide, nonamethylenedicyanamide and decamethylenedicyanamide by mixing more than two of them together in certain porportions and then putting them under the same polymerization process, in a very short period of time.

*Example 13*

By dissolving 20 g. of hexamethylenedicyanamide in 80 g. alcohol or ketone (the same as in Example 9) and then adding some 0.2 to 0.0002 gram of polymerization accelerators (the same as in Example 11) and using the solution by itself or by adding an appropriate amount of fillers (the same as in Example 9), and heating the solution up to normal temperature or higher, for instance from 10 to 70° C., to evaporate the solvents and either leaving the resulting solution under room temperature for a long period of time (from 10 to 20 hours) or heating it up to 40 to 80° C., it will solidify in several to 30 minutes and the reaction completed in a very short time resulting in the formation of a hard, colorless, transparent and lustrous polymer which is moldable and can be made into fiber.

The properties of this polymer are exactly the same as those of the polymer obtained in Example 1.

In the same manner, respective polymers of tetramethylenedicyanamide, pentamethylenedicyanamide, heptamethylenedicyanamide, octamethylenedicyanamide, nonamethylenedicyanamide, decamethylenedicyanamide can be obtained in a very short period of time by dissolving them in alcohols or ketones (the same as in Example 9) and adding a small amount of polymerization accelerators (the same as in Example 11) and putting them through the same polymerization process.

*Example 14*

By dissolving a mixture of 15 g. of octamethylenedicyanamide and 5 g. of nonamethylenedicyanamide in 80 g. of alcohol or ketone (the same as in Example 9) and then adding polymerization accelerators (the same as in Example 11) in the amount of 0.2 to 0.0002 gram and using the solution by itself or by adding an appropriate amount of fillers (the same as in Example 9) and heating the solution up to normal temperature or higher, for instance from 10 to 70° C. to evaporate the solvents, and either leaving the resulting solution under room temperature for a long time, for instance 10 to 20 hours or heating it up to 40–80° C., it will solidify in several to 30 minutes and the reaction completed in a very short time resulting in the formation of a hard, colorless, transparent and glossy copolymer which is moldable and can be made into fiber.

The properties of this copolymer are exactly the same as those of the polymer in Example 7.

In the same manner, the respective copolymers can be obtained in a very short period of time from tetramethylenedicyanamide, pentamethylenedicyanamide, hexamethylenedicyanamide, heptamethylenedicyanamide, octamethylenedicyanamide, nonamethylenedicyanamide and decamethylenedicyanamide by mixing more than two of them together in certain proportions and then dissolving them in alcohols or ketones (the same as in Example 9) to which had been added a small amount of polymerization accelerators (the same as in Example 11) and putting them through the same polymerization process.

*Example 15*

When one or more tetremethylenedicyanamide, pentamethylene dicyanamide, hexamethylenedicyanamide, heptamethylenedicyanamide, octamethylenedicyanamide, nonamethylenedicyanamide and decamethylenedicyanamide are used alone or mixed together and spread or coated homogenously on the surface of a glass plate at the rate of 1 gram per 100 cm.$^2$ or when the primary polymerization or copolymerization products obtained in Example 1 through Example 8 are coated evenly on a glass plate in the same ratio (in case alkylenedicyanamide or its mixture is used, after they have been heated and melted to transparency near the melting point or eutectic point), and when another glass plate is pressed on the first glass plate and heated at a temperature of more than 40° C. but less than 100° C., the polymerization is completed in 10 to 60 minutes and the glass plates are combined with each other colorlessly and transparently.

In this case, the shear strength will be about 400 kg./cm.$^2$ when hexamethylenedicyanamide is used while the glass failure is 100 percent. Even if the glass is boiled in water for two hours or more, the strength does not diminish.

*Example 16*

When one or more tetramethylenedicyanamide, pentamethylenedicyanamide, hexamethylenedicyanamide, heptamethylenedicyanamide, octamethylenedicyanamide, nonamethylenedicyanamide and decamethylenedicyanamide are used alone or mixed together and spreaded or coated homogeneously on the surface of a glass plate at the rate of one gram per 100 cm.$^2$ or when the primary polymerization or copolymerization products obtained in Example 1 through Example 8 are coated evenly on a glass plate in the same ratio (in case alkylenedicyanamide or its mixture is used, after they have been heated and melted to transparency near the melting point or eutectic point), and when a metallic plate, for instance, iron, copper, nickel, aluminium, stainless steel etc. is pressed on the glass plate and heated at a temperature of more than 40° C. but less than 100° C., the polymerization is completed in 10 to 60 minutes and the glass and metallic plate are combined with each other tightly.

In case hexamethylenedicyanamide is used to bind a glass plate and a copper plate together, the shear strength will be about 400 kg./cm.$^2$ and the strength will not diminish even under boiling water treatment.

*Example 17*

When one or more tetramethylenedicyanamide, pentamethylenedicyanamide, hexamethylenedicyanamide, heptamethylenedicyanamide, octamethylenedicyanamide, nonamethylenedicyanamide and decamethylenedicyanamide are used alone or mixed together and spreaded or coated homogeneously on the surface of a wooden board at the ratio of one gram per 100 cm.$^2$ or when the primary polymerization or copolymerization products obtained in Example 1 through Example 8 are coated evenly on a wooden board in the same ratio (in case alkylenedicyanamide or its mixture is used, after they have been heated and melted to transparency near the melting point or eutectic point), and when a second wooden board is pressed on the first board and heated at a temperature of more than 40° C. but less than 100° C., the polymerization is completed in 10 to 60 minutes and the boards are combined with each other firmly.

In case hexamethylenedicyanamide is used to bind the boards together, the shear strength will be about 200 kg./cm.$^2$ and the wood failure 100 percent.

*Example 18*

When one or more tetramethylenedicyanamide, pentamethylenedicyanamide, hexamethylenedicyanamide, heptamethylenedicyanamide, octamethylenedicyanamide, nonamethylenedicyanamide and decamethylenedicyanamide are used alone or mixed together and spread or coated on the surface of a metallic plate (the same as in Example 16) at the ratio of one gram per 100 cm.$^2$ or when the primary polymerization or copolymerization products obtained in Example 1 through Example 8 are coated evenly on a metallic plate (the same as in Example 16) in the same ratio (in case alkylenedicyanamide or its mixture is used after they have been heated and melted to transparency near the melting point or eutectic point), and when another similar metallic plate or a ceramic plate is pressed on the first plate and heated at a temperature of more than 40° C. but less than 100° C., the polymerization is completed in 10 to 60 minutes and the plates are combined with each other tightly.

*Example 19*

When one or more kinds of alkylenedicyanamide such as tetramethylenedicyanamide, pentamethylenedicyanamide, hexamethylenedicyanamide, heptamethylenedicyanamide, octamethylenedicyanamide, nonamethylenedicyanamide and decamethylenedicyanamide are used alone or mixed together and dissolved in methanol (or ethanol, propanol and other aliphatic alcohol or such ketones as acetone and methylethylketone etc.) to a concentration of more than 10 percent if desired it is possible to raise the concentration to more than 80 percent by heating, or when the primary polymerization or copolymerization products obtained in Example 1 through Example 8 are dissolved in the same solvent to the same concentration as described above and both of the solutions coated evenly on the surface of glass, metallic, ceramic or wooden material and after the solvents are evaporated under normal or higher temperature such as from 10 to 70° C., and then a second glass, metallic, wooden or ceramic material pressed on the first material and put under the same treatment as indicated in Example 15, then these materials are combined with each other tightly.,

*Example 20*

When polymerization accelerators (the same as in Example 11) are added to one or a mixture of two or more of tetramethylenedicyanamide, pentamethylenedicyanamide, hexamethylenedicyanamide, heptamethylenedicyanamide, octamethylenedicyanamide, nonamethylenedicyanamide and decamethylenedicyanamide or added to the primary polymerization or copolymerization products obtained in Example 1 through Example 8, at the rate of 0.01–0.0001 part to one part of both of the latter and this mixture or products coated evenly on the surface of glass, metallic, ceramic or wooden material (in case alkylenedicyanamide or its mixture is used after they have been heated and melted to transparency near the melting point or eutectic point) and a second glass, metallic, wooden or ceramic material pressed on the first material and left under normal temperature for a long period of time (10 to 20 hours), or when treated to the same process as mentioned in Example 15 through Example 18, the polymerization reaction is completed in several to 30 minutes and it is possible to completely combine the materials together firmly in a short period of time.

*Example 21*

When polymerization accelerators (the same as in Example 11) are added to one or a mixture of two or more of tetramethylenedicyanamide, pentamethylenedicyanamide, hexamethylenedicyanamide, heptamethylenedicyanamide, octamethylenedicyanamide, nonamethylenedicyanamide and decamethylenedicyanamide or added to the primary polymerization or copolymerization products obtained in Example 1 through Example 8 at the rate of 0.01–0.0001 part to one part of both of the latter and when this mixture or products are dissolved in alcohol or ketones (the same as in Example 19) to a concentration of more than 10 percent and then this solution coated evenly on the surface of glass, metallic, ceramic or wooden material and after the solvents are evaporated under normal or higher temperature (10 to 70° C.) and then a second glass, metallic, wooden or ceramic material pressed on the first material and left under normal temperature for a long time (10 to 20 hours), or when treated to the same process as mentioned in Example 15 through Example 18 the polymerization reaction is completed in several to 30 minutes and it is possible to completely combine the materials together firmly in a short period of time.

*Example 22*

When one or a mixture of two or more of tetramethylenedicyanamide, pentamethylenedicyanamide, hexamethylenedicyanamide, nonamethylenedicyanamide and decamethylenedicyanamide is melted into liquid form by heating up to the melting point or eutectic point, or when their concentrated solution (the same as in Example 19) in alcohols or ketones (the same as in Example 9), or when the primary polymerization or copolymerization products obtained in Example 1 through Example 8 as well as their concentrated solution in alcohols or ketones (the same as in Example 19) are respectively coated on the surface of metallic plates (the same as in Example 16), semiconductors, for example, germanium, silicon, selenium etc., ceramic and wooden material evenly and after the solvents are evaporated under normal or higher temperature (10 to 70° C.) and then further heated to more than normal temperature but less than 100° C., a hard colorless and transparent, glossy film is found adhering strongly to the surface of the material.

This film is strongly resistant to moisture as well as rust and not only makes a good insulator but is also noninflammable.

*Example 23*

When one or a mixture of two or more of tetramethylenedicyanamide, pentamethylenedicyanamide, hexamethylenedicyanamide, heptamethylenedicyanamide, octamethylenedicyanamide, nonamethylenedicyanamide and decamethylenedicyanamide is melted into liquid form by heating up to the melting point or eutectic point, or when their concentrated solution (the same as in Example 19) in alcohols or ketones (the same as in Example 9), or when the primary polymerization or copolymerization products obtained in Example 1 through Example 8, as well as their concentrated solution in the same solvents (the same as in Example 19) to which pigment or metallic powder had been respectively added are respectively coated evenly on the surface of glass, metallic, ceramic or wooden basic material, and after the solvents are evaporated by heating to normal or higher temperatures (10 to 70° C.), and then further heated to more than normal temperature but less than 100° C., a hard, glossy film is found adhering strongly to the surface of the material.

*Example 24*

In the case of Examples 22 and 23 when amines as polymerization accelerators are added at the ratio of 0.01–0.0001 gram to one gram of alkylenedicyanamide, it is possible to obtain a film at room temperature in about 10 to 20 hours. When it is heated up to 100° C., the polymerization time will be greatly cut to within 30 minutes.

We claim:

1. A process for bonding solid materials comprising coating at least one surface of one of the materials with a substance consisting essentially of at least one alkylenedicyanamide which is represented by the formula $NC \cdot HN(CH_2)_n NH \cdot CN$, wherein $n$ is an integer from 4 to 20, to form a film on said one surface, placing said one surface against the surface of another material and polymerizing said film by heating the same at a temperature between 10 and 100° C. for a period of 10 to 60 minutes.

2. A process according to claim 1 wherein the alkylenedicyanamide is dissolved in a volatile solvent.

3. A process according to claim 2 wherein the solvent is selected from the group consisting of methanol, ethanol, propanol, butanol, acetone and methylethylketone.

4. A process according to claim 1 wherein a polymerization accelerator selected from the group consisting of aliphatic and aromatic amines in an amount from 0.01–0.0001 part is added to one part of alkylenedicyanamide.

5. A process for bonding together glass, metal, ceramic, and wood materials and the like comprising coating at least one surface of one of the materials with a substance consisting essentially of at least one alkylenedicyanamide which is represented by the formula $$NC \cdot HN(CH_2)_n NH \cdot CN$$

wherein $n$ is an integer from 4 to 10, to form a film on said one surface, placing said one surface against another surface and polymerizing said film by heating at 40–80° C. for a time between 1 and 5 hours.

6. A process according to claim 5 wherein the alkylenedicyanamide is dissolved in a volatile solvent.

7. A process according to claim 6 wherein the solvent is selected from the group consisting of methanol, ethanol, propanol, butanol, acetone and methylethylketone.

8. A process according claim 5 wherein a polymerization accelerator selected from the group consisting of aliphatic and aromatic amines in an amount from 0.01–0.0001 part is added to one part of alkylenedicyanamide.

References Cited by the Examiner

UNITED STATES PATENTS

| | | | |
|---|---|---|---|
| 2,325,586 | 8/1943 | Bolton et al. | 260—2 |
| 2,349,851 | 5/1944 | Dreyfus | 260—2 |
| 3,033,720 | 5/1962 | Siegrist et al. | 156—331 |

FOREIGN PATENTS 514,983  7/1955  Canada.

OTHER REFERENCES

Ellis, C., Chemistry of Synthetic Resins. N. Y., Reinhold, 1935, pp. 679–681.

EARL M. BERGERT, *Primary Examiner*.

W. B. WALKER, J. F. MATHEWS, C. B. COSBY,
*Assistant Examiners*.